United States Patent [19]

Brown et al.

[11] 4,388,138

[45] Jun. 14, 1983

[54] PREPARING PARTICLEBOARD UTILIZING A VEGETABLE WAX OR DERIVATIVE AND POLYISOCYANATE AS A RELEASE AGENT ON METAL PRESS PARTS

[75] Inventors: James P. Brown, Manchester; Graham Gibbins, Lancashire; Robert S. Hampson, Oldham, all of England

[73] Assignee: Imperial Chemical Industries Limited, London, England

[21] Appl. No.: 289,733

[22] Filed: Aug. 3, 1981

[30] Foreign Application Priority Data

Aug. 11, 1980 [GB] United Kingdom ............... 8026057

[51] Int. Cl.³ .................... B32B 21/02; C08L 91/06
[52] U.S. Cl. .................. 156/289; 156/296; 156/331.4; 106/271
[58] Field of Search ............. 156/62.2, 289, 331.4, 156/296; 106/270, 2, 271, 287.25; 264/123

[56] References Cited

U.S. PATENT DOCUMENTS

| | | | |
|---|---|---|---|
| 2,094,771 | 10/1937 | Charch et al. | 106/271 |
| 2,177,240 | 10/1939 | Brumbaugh | 106/271 |
| 2,206,090 | 7/1940 | Haggenmacher | 106/271 |
| 3,374,100 | 3/1968 | Goldstein et al. | 106/2 |
| 3,677,808 | 7/1972 | Sheridan . | |
| 3,880,975 | 4/1975 | Lundmark . | |
| 3,930,110 | 12/1975 | Shoemaker | 156/62.2 |
| 4,209,433 | 6/1980 | Hse | 156/62.2 |
| 4,241,133 | 12/1980 | Lund et al. | 156/62.2 |
| 4,279,788 | 7/1981 | Lambuth | 156/331.4 |

FOREIGN PATENT DOCUMENTS

| | | |
|---|---|---|
| 2805951 | 8/1979 | Fed. Rep. of Germany . |
| 397834 | 11/1977 | Sweden . |
| 1523601 | 3/1976 | United Kingdom . |
| 1432711 | 4/1976 | United Kingdom . |
| 2031914 | 4/1980 | United Kingdom . |

OTHER PUBLICATIONS

Maloney, Modern Particleboard & Dry-Process Fiberboard Manufacturing.

*Primary Examiner*—Jerome W. Massie
*Attorney, Agent, or Firm*—Cushman, Darby & Cushman

[57] ABSTRACT

Sheets or moulded bodies, for example particle board, are manufactured by hot pressing a lignocellulosic material in contact with an organic polyisocyanate and a wax release agent which is a vegetable wax, a modified vegetable oil, a microcrystalline wax or a mineral wax, said wax release agent having a melting point of at least 70° C. Preferably the wax release agent is applied to the lignocellulosic material in the form of a dispersion in an aqueous emulsion of the polyisocyanate. The process facilitates the release of the sheets or moulded bodies from the caul plates or platens of the press.

8 Claims, No Drawings

PREPARING PARTICLEBOARD UTILIZING A VEGETABLE WAX OR DERIVATIVE AND POLYISOCYANATE AS A RELEASE AGENT ON METAL PRESS PARTS

This invention relates to sheets or moulded bodies and methods for their manufacture.

The use of organic polyisocyanates as binders for ligno-cellulosic material in the manufacture of sheets or moulded bodies such as chipboard, fibreboard and plywood is well known.

In a typical process, the organic polyisocyanate, optionally in the form of a solution or an aqueous emulsion, is applied to the ligno-cellulosic material which is then subjected to heat and pressure. The high quality of the resulting articles is due, to a very large extent, to the excellent adhesive properties of organic polyisocyanates. At the same time, however, these adhesive properties can be a disadvantage in that they cause severe sticking of the ligno-cellulosic material to the hot metal surfaces with which it comes into contact during the hot-pressing operation. The product can be harmed in this way or even rendered entirely worthless and the subsequent cleaning of the contaminated surfaces is difficult, time-consuming and costly.

Several attempts have been made to overcome this adhesion problem but no completely satisfactory solution has been found. Thus, the conventional release agents such as oils, wax polishes, silicones and polytetrafluoroethylene have proved unsatisfactory as have the specialised urethane release agents including those used in structural foam applications.

In our U.S. Pat. No. 4,110,397 it has been proposed to apply a metallic soap at the interface of the ligno-cellulosic material and the mould surface. The metallic soaps are, in fact, excellent release agents but in practice their efficient application to the appropriate surfaces causes problems and limits their usefulness.

A technique that has been used in the manufacture of particleboard is to provide a core of isocyanate treated wood chips with outer layers of chips separately treated with a formaldehyde condensate adhesive resin. The adhesion problem is reduced in this way but the quality of the product is less satisfactory. The use of release papers has also been tried but causes process difficulties and adds to costs.

It has been reported by Thomas M. Maloney in "Modern Particleboard and Dry-Process Fiberboard Manufacturing" (Miller-Freeman Publications) that the inclusion of a paraffin wax in a particleboard formulation together with formaldehyde based resins to improve water-repellency helps to keep the board from sticking to the caul plates and hot press (page 401). Paraffin waxes do not have this effect when polyisocyanates are used as binders and it is acknowledged at page 377 of the same book that the adhesion of isocyanates to caul plates and press parts is a serious problem.

It has now surprisingly been found that excellent release from metal and other surfaces is obtained if, in addition to being treated with an organic polyisocyanate, the ligno-cellulosic material is treated with certain wax release agents as hereinafter defined.

Thus, according to the invention, there is provided a process for the manufacture of sheets or moulded bodies which comprises hot pressing a ligno-cellulosic material in contact with an organic polyisocyanate and a wax-release agent which is a vegetable wax, a modified vegetable oil, a microcrystalline wax or a mineral wax, said wax release agents having a melting point of at least 70° C.

Vegetable waxes which may be used in the process of the invention include any vegetable wax having a melting point of at least 70° C. Carnauba wax (melting point 83°–86° C.) is particularly effective. Modified vegetable oils having melting points of at least 70° C. include hydrogenated castor oil. Microcrystalline waxes which may be used in the process of the invention include Bareco and Amsco waxes. Suitable mineral waxes include Montan wax. Mixtures of wax release agents may be used.

The process of the invention is readily carried out by applying the organic polyisocyanate and the wax release agent to the ligno-cellulosic material and then subjecting the treated material to heat and pressure. The wax may be applied before or after the polyisocyanate but preferably the two are applied together. To facilitate even distribution, the wax may be applied in the form of a solution in an organic solvent which may be the polyisocyanate but preferably it is applied in the form of an aqueous dispersion, preferably a dispersion in the aqueous emulsion of the polyisocyanate. If desired, other conventional binding agents, such as formaldehyde condensate adhesive resins, may be used in conjunction with the polyisocyanate. Conventional additives for example water-repellency aids, may be used. For example a paraffin wax water-repellency additive may be incorporated in the dispersion of the wax release agent.

The polyisocyanate may be applied in such an amount to give a weight ratio of polyisocyanate to ligno-cellulosic material in the range of 0.1:99.9 to 20:80, preferably 0.5:99.5 to 7.0:93. A suitable weight ratio of wax to ligno-cellulosic material is in the range 0.01:99.99 to 10:90, preferably 0.1:99.9 to 2.0:98.0.

In particleboard manufacture, the ligno-cellulosic material and polyisocyanate may be conveniently mixed by spraying the polyisocyanate on to the lignocellulosic material while it is being agitated in an enclosed mixer either of a single batch type or a continuous type. The polyisocyanate is preferably employ in the form of an aqueous emulsion and since the wax is conveniently applied in the form of an aqueous dispersion, the polyisocyanate and wax are most suitably sprayed on to the lignocellulosic material in a single aqueous system.

The treated lignocellulosic material may then be sprinkled on to caul plates, usually made of aluminium or steel, which serve to carry the "furnish" into the press where it is compressed to the desired extent, usually at a temperature between 140° and 230° C. In the absence of an efficient release agent the ligno-cellulosic material adheres strongly to the caul plates and/or the platens of the press. In the process of the present invention, the adhesion of particles of the ligno-cellulosic material to the metal surfaces is reduced to a negligible extent. This is so even when the surfaces are already contaminated with resinous materials or their degradation products. At the start of a manufacturing run it is helpful, but not essential, to condition the caul plates using a wax release agent of the type used in the process of the invention. Thus the caul plate are suitably sprayed with an aqueous dispersion of the wax release agent. The conditioned plates may then be used a large number of times in the process of the invention without further treatment.

Other methods of manufacturing particleboard include depositing the treated ligno-cellulosic material on to conveyor belts for transfer to the press and here again the process of the invention is advantageous in minimising adhesion of the ligno-cellulosic material to the belts and press.

More detailed descriptions of methods of manufacturing particleboard and similar products based on ligno-cellulosic material are available in the literature. The techniques and equipment conventionally used can be adapted for use in the process of the invention.

In some manufacturing situations, the treated ligno-cellulosic material may come into contact with materials other than those specifically mentioned above, for example brass, chrome plated surfaces and plastics materials. In such situations, the process of the invention is again remarkably effective in minimising unwanted adhesion.

The sheets and moulded bodies produced in accordance with the invention have excellent mechanical properties and they may be used in any of the situations where such articles are customarily used.

The invention is illustrated by the following Examples in which all parts and percentages are by weight unless otherwise stated.

EXAMPLE 1

An aqueous dispersion of carnauba wax was prepared by dissolving 2 parts of a condensate of cetyl/oleyl alcohol with 17 mols of ethylene oxide as emulsifying agent in 88 parts of water at 95°–98° C. and then adding 10 parts of carnauba wax at the same temperature with constant stirring. After addition of the wax, the dispersion was stirred whilst cooling to room temperature. (The wax dispersion may also be prepared by dissolving the above-mentioned emulsifying agent in the wax and then stirring the wax into water at the above temperature).

An emulsifiable isocyanate was prepared by reacting 3 parts of methoxy polyethylene glycol (molecular weight 650) with 97 parts of crude MDI having an NCO content of 30% and containing approximately 50% of diphenylmethane diisocyanates, the remainder being polymethylene polyphenyl polyisocyanates of higher functionality.

6 parts of emulsifiable isocyanate were thoroughly mixed into 12 parts of the wax dispersion to give an isocyanate emulsion which was sprayed on to 102 parts of a 50/50 spruce/pine wood chip mixture (moisture content 2.0% particle size 5 mesh) using a laboratory rotary blender. Two caul plates 50 cm×50 cm, one aluminium the other steel, were conditioned by spraying with a carnauba wax dispersion made as described above. The blended treated chip was then placed on the bottom aluminium caul plate to give a furnish of depth 8 cm. The caul plate was then transferred to a single daylight press with platen temperatures 175° C., the steel caul plate placed on top of the furnish and 19 mm metal stops placed in position. The press was closed and a ram pressure of 900–1100 psi (i.e. board pressure 350–550 psi) was maintained for 4 minutes 45 seconds. The press was then opened and the particle board released from both surfaces without any noticeable adhesion. The operation was repeated 35 times without any further conditioning of the caul plates, the result being the same in each case. The particle boards were still releasing from caul plates satisfactorily when the run was terminated and the caul plates could have been used an even larger number of times without further conditioning.

Typical properties of the particle board prepared were as follows:

(a) At a density of 730 Kg/m³

| | |
|---|---|
| Dry internal bond (standard V20 test) | 1.48 N/m² |
| Wet internal bond (standard V100 test) | 0.46 N/m² |

(b) At a density of 620 Kg/m³

| | |
|---|---|
| Dry internal bond (V20) | 1.18 N/m² |
| Wet internal bond (V100) | 0.51 N/m² |

EXAMPLE 2

The procedure of Example 1 was repeated using 2 parts of montan wax in place of the 2 parts of carnauba wax.

A number of boards were manufactured, and at the termination of the run, the boards were still releasing satisfactorily from the caul plates.

Typical properties of the boards were:

| | |
|---|---|
| Density | 610 Kg/m³ |
| Dry internal bond (V20) | 1.24 N/m² |
| Wet internal bond (V100) | 0.37 N/m² |

EXAMPLE 3

The procedure of Example 1 was repeated using a reduced proportion of emulsifiable isocyanate. Thus 2.5 parts of the emulsifiable isocyanate were thoroughly mixed into 12 parts of the wax dispersion and sprayed onto 102 parts of a 50/50 spruce/pine wood chip mixture.

A number of boards were manufactured, and at the termination of the run, the boards were still releasing satisfactorily from the caul plates.

Typical properties of the boards were:

| | |
|---|---|
| Density | 610 Kg/m³ |
| Dry internal bond (V20) | 0.65 N/m² |

EXAMPLE 4

The procedure of Example 3 was repeated using 2 parts of montan wax in place of the 2 parts of carnauba wax.

A number of boards were manufactured, and at the termination of the run, the boards were still releasing satisfactorily.

EXAMPLE 5

The procedure of Example 1 was repeated using a reduced proportion of both the emulsifiable isocyanate and the wax release agent. Thus 2.5 parts of the emulsifiable isocyanate were thoroughly mixed into 6 parts of water and 6 parts of the carnauba wax dispersion and sprayed onto 102 parts of a 50/50 spruce/pine wood chip mixture.

The particle board manufacture was repeated 18 times without any further conditioning, and the boards were still releasing satisfactorily at the termination of the run.

EXAMPLE 6

The procedure of Example 1 was repeated using 102 parts of beech chip (moisture content 2.0% particle size 5 mesh) in place of the 102 parts of a 50/50 mixture of spruce/pine wood chip.

A number of boards were prepared, and the boards were still releasing satisfactorily when the run was terminated.

Typical properties of the boards prepared were:

| | |
|---|---|
| Density | 750 Kg/m$^3$ |
| Dry internal bond (V20) | 1.15 N/m$^2$ |
| Wet internal bond (V100) | 0.25 N/m$^2$ |

EXAMPLE 7

The procedure of Example 6 was repeated using 2 parts of montan wax in place of the 2 parts of carnauba wax.

A number of boards were prepared, and the boards were still releasing satisfactorily when the run was terminated.

Typical properties of the boards prepared were:

| | |
|---|---|
| Density | 777 Kg/m$^3$ |
| Dry internal bond (V20) | 1.13 N/m$^2$ |
| Wet internal bond (V100) | 0.27 N/m$^2$ |

EXAMPLE 8

The procedure of Example 3 was repeated using 102 parts of beech chip (moisture content 2.0% particle size 5 mesh) in place of the 102 parts of a 50/50 mixture of spruce/pine chip.

A number of boards were manufactured, and at the termination of the run the boards were still releasing satisfactorily.

| | |
|---|---|
| Density | 750 Kg/m$^3$ |
| Dry internal bond (V20) | 0.357 N/m$^2$ |

EXAMPLE 9

An aqueous dispersion in water of carnauba wax and an emulsifiable isocyanate were prepared as in Example 1.

A three layer board was prepared by interleaving a layer of core material between two layers of surface material, the final construction of the board having a surface material to core material ratio of 33:66.

The surface material was prepared by thoroughly mixing 6 parts of the emulsifiable isocyanate into 12 parts of the wax dispersion to givenan isocyanate emulsion which was sprayed onto 102 parts of a 50/50 spruce/pine wood chip mixture (moisture content 2.0%, particle size, a 50/50 blend of 10 and 25 mesh) using a laboratory rotary blender.

The core material was prepared similarly, but without using any wax release agent. Thus 6 parts of the emulsifiable isocyanate were thoroughly mixed into 12 parts of water to give an isocyanate emulsion which was sprayed onto 102 parts of a 50/50 spruce/pine wood chip mixture (moisture content 2.0% particle size 5 mesh).

Two caul plates 50 cm×50 cm, one aluminium and the other steel were conditioned with a carnauba wax dispersion made as directed above, and 50% of the treated surface material was placed on the bottom aluminium caul plate followed by the core material and finally the remainder of the surface material. The manufacture of particle boards proceeded as described in Example 1.

A number of boards were manufactured, and the boards were still releasing satisfactorily when the run was terminated.

Typical properties of the boards prepared were:

| | |
|---|---|
| Density | 605 Kg/m$^3$ |
| Dry internal bond (V20) | 1.23 N/m$^2$ |
| Wet internal bond (V100) | 0.38 N/m$^2$ |

EXAMPLE 10

The procedure of Example 9 was repeated using an aqueous dispersion of montan wax in place of the dispersion of carnauba wax. In addition, the upper steel caul plate was omitted, and the top platen contact face of the single daylight press was used directly after conditioning by spraying wth a montan wax dispersion as described above.

A number of boards were manufactured, and at the termination of the run, the boards were still releasing satisfactorily.

Typical properties of the boards prepared were:

| | |
|---|---|
| Density | 695 Kg/m$^3$ |
| Dry internal bond (V20) | 1.34 N/m$^2$ |
| Wet internal bond (V100) | 0.52 N/m$^2$ |

EXAMPLE 11

The procedure of Example 10 was repeated using a reduced level of emulsifiable isocyanate in the surface and core materials. Thus 2.5 parts of the emulsifiable isocyanate were used instead of the 6 parts of emulsifiable isocyanate used in Examples 9 and 10.

A number of boards were manufactured, and at the termination of the run, the boards were still releasing satisfactorily.

Typical properties of the boards prepared were:

| | |
|---|---|
| Density | 690 Kg/m$^3$ |
| Dry internal bond (V20) | 0.94 N/m$^2$ |
| Wet internal bond (V100) | 0.20 N/m$^2$ |

EXAMPLE 12

The procedure of Example 9 was repeated using an aqueous dispersion of montan wax in place of the carnauba wax. In addition, in place of the aluminium and steel caul plates, there was used two 50 cm×50 cm sections from a Becher Van Hullen Flescoplan wire mesh caul plate. The lower caul plate was unused, but the upper caul plate had been used for particle board manufacture with a conventional urea/formaldehyde resin binder and was contaminated with resin residues at various degrees of degradation. Both plates were conditioned with the montan wax dispersion made as described above.

A number of boards were manufactured, and at the termination of the run, the boards were still releasing satisfactorily from both the lower and upper (contaminated) plates.

Typical properties of the boards produced were:

| Density | 539 Kg/m³ |
|---|---|
| Dry internal bond (V20) | 1.05 N/m² |
| Wet internal bond (V100) | 0.31 N/m² |

EXAMPLE 13

The procedure of Example 9 was repeated using an aqueous dispersion of montan wax in place of the carnauba wax. In addition the surface material was prepared as follows:

12 Parts of the montan wax dispersion was sprayed onto 102 parts of a 50/50 spruce/pine wood chip mixture (moisture content 2.0%, 50/50 blend of 10 and 25 mesh particle size followed by 6 parts of crude MDI (commercially available as SUPRASEC DND) using a laboratory rotary blender. The core material was prepared as in Example 9.

A number of boards were manufactured, and at the termination of the run, the boards were still releasing satisfactorily.

Typical properties of the boards prepared were:

| Density | 530 Kg/m³ |
|---|---|
| Dry internal bond (V20) | 0.87 N/m² |
| Wet internal bond (V100) | 0.28 N/m² |

EXAMPLE 14

The procedure of Example 1 was repeated using a montan wax dispersion in place of the carnauba wax dispersion. In addition, there was incorporated into the montan wax dispersion 1.5 parts of a paraffin wax dispersion conventionally used as a water-repellency aid and commercially available as MOBILLER 80/230.

A number of boards were manufactured, and at the termination of the run, the boards were still releasing satisfactorily.

EXAMPLE 15

The procedure of Example 1 was repeated except that instead of spraying the isocyanate emulsion onto the wood chip mixture, the isocyanate emulsion containing the wax dispersion was poured onto the wood chip mixture whilst it was in the laboratory rotary blender. This is a close simulation of a commercial high speed tangential entry blender.

A number of boards were manufactured, and despite the poorer dispersion of the emulsion, the boards were still releasing satisfactorily when the run was terminated.

Typical properties of the boards prepared were:

| Density | 618 Kg/m³ |
|---|---|
| Dry internal bond (V20) | 0.670 N/m² |
| Wet internal bond (V100) | 0.185 N/m² |

We claim:

1. A process for the continuous manufacture of sheets or moulded bodies which comprises hot pressing a ligno-cellulosic material in contact with an aqueous dispersion of an organic polyisocyanate and a wax release agent which is selected from the group consisting of a vegetable wax and a modified vegetable oil, said wax release agent having a melting point of at least 70° C. whereby there is achieved release of successive batches of said ligno-cellulosic material from metal parts of the press with which it comes into contact during hot pressing.

2. A process according to claim 1 wherein the wax release agent is carnauba wax.

3. A process according to claim 1 wherein the wax release agent is applied together with the organic polyisocyanate in the form of a dispersion in the aqueous emulsion of the polyisocyanate.

4. A process according to claim 1 wherein the ratio of the organic polyisocyanate to the ligno-cellulosic material is in the range 0.1:99.9 to 20:80 by weight.

5. A process according to claim 4 wherein the ratio of the organic polyisocyanate to the ligno-cellulosic material is in the range 0.5:99.5 to 7.0:93.0 by weight.

6. A process according to claim 1 wherein the ratio of the wax release agent to the ligno-cellulosic material is in the range 0.001:99.99 to 10:90 by weight.

7. A process according to claim 6 wherein the ratio of the wax release agent to the ligno-cellulosic material is in the range 0.1:99.9 to 2.0:98.00.

8. An aqueous emulsion of an organic polyisocyanate having dispersed therein a wax release agent which is selected from the group consisting of a vegetable wax and a modified vegetable oil, said wax release agent having a melting point of at least 70° C.